(12) United States Patent
Nirwani et al.

(10) Patent No.: US 7,979,331 B2
(45) Date of Patent: Jul. 12, 2011

(54) VERIFYING WHETHER A SOFTWARE PACKAGE CALCULATING EFC USED FOR DETERMINING FEDERAL STUDENT FINANCIAL AID IS IMPLEMENTED ACCORDING TO A SPECIFICATION

(75) Inventors: Raghav Nirwani, Hyderabad (IN); Cheslyn Dcruz, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 316 days.

(21) Appl. No.: 12/020,587

(22) Filed: Jan. 28, 2008

(65) Prior Publication Data

US 2009/0150275 A1 Jun. 11, 2009

(30) Foreign Application Priority Data

Dec. 6, 2007 (IN) .......................... 2928/CHE/2007

(51) Int. Cl.
*G06Q 40/00* (2006.01)
(52) U.S. Cl. .......................................................... 705/35
(58) Field of Classification Search ...................... 705/35
See application file for complete search history.

(56) References Cited

U.S. PATENT DOCUMENTS

2003/0009687 A1* 1/2003 Ferchau et al. ............... 713/200
2003/0093346 A1* 5/2003 Weber .............................. 705/35

OTHER PUBLICATIONS

"U.S. Department of Education, Federal Student Aid", "FSA Download—Software & Manuals (CPS Test System 2008-2009)", "http://fsadownload.ed.gov/CPSTestSys0809.htm", Last modified Date: Mar. 28, 2008, pp. 1-1.
"U.S. Department of Education, Federal Student Aid", "Funding Education Beyond High School", Date: Dec. 2006; pp. 1-60.
"U.S. Department of Education, Federal Student Aid", "2007-2008 FAFSA (Free Application for Federal Student Aid)", Date: 2007, pp. 1-4.
"U.S. Department of Education, Federal Student Aid", The EFC (Expected Family Contribution) Formula, 2007-2008, Date: 2007, pp. 1-35.
"U.S. Department of Education, Federal Student Aid", "Specifications For Software Developers Academic Year 2008-2009 Draft Version 1.0", Date: Aug. 1, 2007, pp. 1-147.
"U.S. Department of Education, Federal Student Aid", "The ISIR Guide 2008-2009", Date: 2008, pp. 1-163.
"U.S. Department of Education, Federal Student Aid", "User Guide for the CPS Test System 2008-2009", Date: 2008, pp. 1-20.

* cited by examiner

*Primary Examiner* — Charles R Kyle
(74) *Attorney, Agent, or Firm* — Narendra Reddy Thappeta

(57) ABSTRACT

Verifying whether a software package designed to calculate EFC (Expected Family Contribution) is implemented in compliance with a specification provided by the US Federal Government for a specific year. In one embodiment, a set of sample ISIRs (Institutional Student Information Records) provided by the US Federal Government is received, with each sample ISIR containing the details of a student and a corresponding expected set of EFC values pre-calculated based on the specification for that specific year. The digital processing system then sends the details of the student contained in a sample ISIR to the software package and in response, receives the corresponding values of the EFC calculated by the software package based on the details of the student. The calculated values of the EFC and the expected values of the EFC are then compared to determine if the software package is implemented in compliance with the specification.

20 Claims, 5 Drawing Sheets

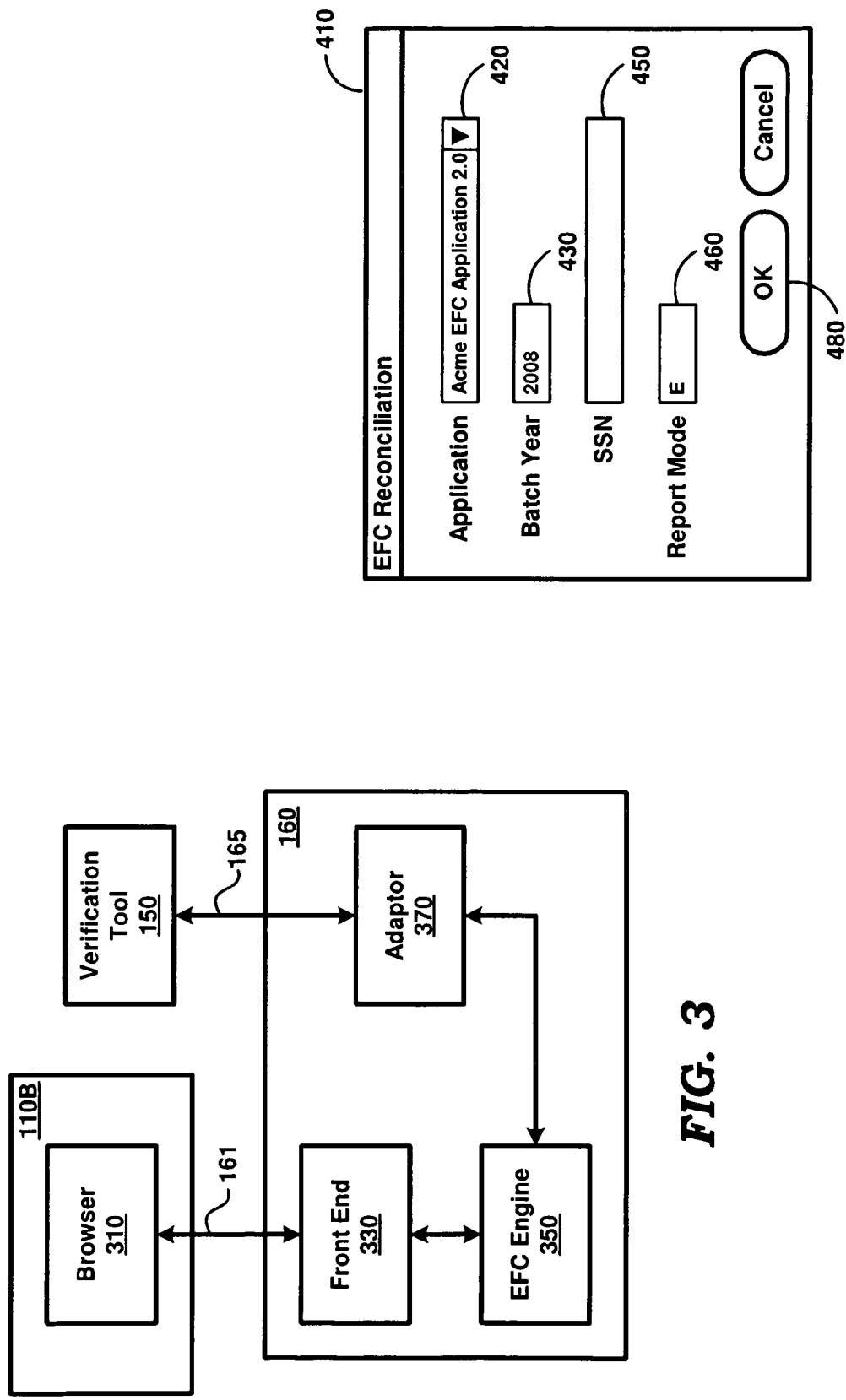

511 → EFC Reconciliation Report
512 → Batch Year: 2008
513 → SSN:

Report ID: 45860
Responsibility: Student System Super User
515 → Application: ACME EFC Application 2.0
Time of Request: 07-SEP-2007 00:36:56
Report Run Time: 07-SEP-2007 00:37:08
Printer: noprint
Save Output: YES 520 → Original Ssn: 999750997  Last Name: FORMULA3  Dependency Status: I  Trans #01

|  | 541<br>CPS | 542<br>SYSTEM | 543<br>Diff(Y/N) 544 |
|---|---|---|---|
| 561 → Primary Alternate Month 1 | 0 | 0 | N |
| 562 → Primary Alternate Month 2 | 0 | 0 | N |
| 563 → Primary Alternate Month 3 | 0 | 0 | N |
| 564 → Primary Alternate Month 4 | 0 | 0 | N |
| 565 → Primary Alternate Month 5 | 0 | 0 | N |
| 566 → Primary Alternate Month 6 | 0 | 0 | N |
| 567 → Primary Alternate Month 7 | 0 | 0 | N |
| 568 → Primary Alternate Month 8 | 0 | 0 | N |
| 569 → Primary Alternate Month 10 | 0 | 0 | N |
| 570 → Primary Alternate Month 11 | 0 | 0 | N |
| 571 → Primary Alternate Month 12 | 0 | 0 | N |
| 572 → Total Income | 14999 | 14999 | N |
| 573 → Allow Total Income | 35796 | 35796 | N |
| 574 → State Tax Allow | 1050 | 1050 | N |
| 575 → Employment Allow | 3200 | 3200 | N |
| 576 → Income Protection Allow | 19070 | 19070 | N |
| 577 → Available Income | -20797 | -20797 | N |
| 578 → Contribution From Ai |  |  | N |
| 579 → Discretionary Networth | -27900 | -27900 | N |
| 580 → Efc Networth | 0 | 0 | N |
| 581 → Asset Protect Allow | 37900 | 27900 | Y |
| 582 → Parents Cont From Assets |  |  | N |
| 583 → Adjusted Available Income | -20797 | -20797 | N |
| 584 → Total Student Contribution | 0 | 0 | N |
| 585 → Total Parent Contribution |  |  | N |
| 586 → Parents Contribution |  |  | N |
| 587 → Student Total Income |  |  | N |

*FIG. 5*

VERIFYING WHETHER A SOFTWARE PACKAGE CALCULATING EFC USED FOR DETERMINING FEDERAL STUDENT FINANCIAL AID IS IMPLEMENTED ACCORDING TO A SPECIFICATION

RELATED APPLICATION

The present application is related to and claims priority from the co-pending India Patent Application entitled, "VERIFYING WHETHER A SOFTWARE PACKAGE CALCULATING EFC USED FOR DETERMINING FEDERAL STUDENT FINANCIAL AID IS IMPLEMENTED ACCORDING To A SPECIFICATION", Serial Number: 2928/CHE/2007, Filed: Dec. 6, 2007, Applicant: Oracle International Corporation, naming the same inventors Raghav Nirwani and Cheslyn Dcruz as in the subject patent application, and is incorporated in its entirety herewith.

BACKGROUND

1. Technical Field

The present disclosure relates to software testing and more specifically to verifying whether a software package calculating EFC (Expected Family Contribution) used for determining federal student financial aid is implemented according to a specification.

2. Related Art

Federal Student Aid is an office of the United States Department of Education whose primary mission is to ensure that all eligible Americans benefit from federal financial assistance such as grants, loans, work-study programs etc., for education beyond high school.

The Free Application for Federal Student Aid (known as FAFSA), is a form that can be filled out (annually) by current and anticipating university students (both undergraduate and graduate) and sometimes their parents in the United States to determine the student's eligibility for federal student financial aid (including grants, loans, and work-study programs). In addition, the information from the FAFSA is used by some states and schools to award non-federal aid.

The FAFSA generally contains numerous questions regarding the student's finances, as well as those of his/her family. The corresponding responses are entered into a formula/specification for determining the Expected Family Contribution (EFC)—a set of values used in determining the financial assistance required by the student. A number of factors are used in determining the EFC such as the family size, income, number in college, assets etc.

A Student Aid Report (SAR), which is a summary of the FAFSA responses (and includes the corresponding EFC), is forwarded to the student. An electronic version of the SAR called an ISIR (Institutional Student Information Record) is sent to the colleges/universities selected by the student on the FAFSA. The ISIR may also be sent to state agencies that award state need-based aid.

Many software packages enable a student to calculate the EFC based on the details (responses of above) of the student. Such software packages generally calculate the EFC based on the formula/specification provided by the office of the Federal Student Aid.

The formula/specification for calculating EFC is often changed by the office of the Federal Student Aid (for example, annually) due to reasons such as change in policy, change in the number of colleges' involved, commercial viability etc. As such, the implementations of the software packages calculating EFC need to be modified to be in compliance with the changed formula/specification.

Thus, it may be desirable to verify whether software packages calculating EFC are implemented according to a formula/specification (of interest).

BRIEF DESCRIPTION OF THE DRAWINGS

Example embodiments of the present invention will be described with reference to the accompanying drawings briefly described below.

FIG. 3 is a block diagram illustrating the details of a software package calculating EFC (to be verified for compliance with a specification) in one embodiment.

FIG. 4 depicts an interface using which an indication that a software package is to be verified for compliance with a specification based on a set of sample ISIRs is received in one embodiment.

FIG. 5 depicts a portion of a discrepancy report generated based on the verification of compliance of a software package to a specification in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
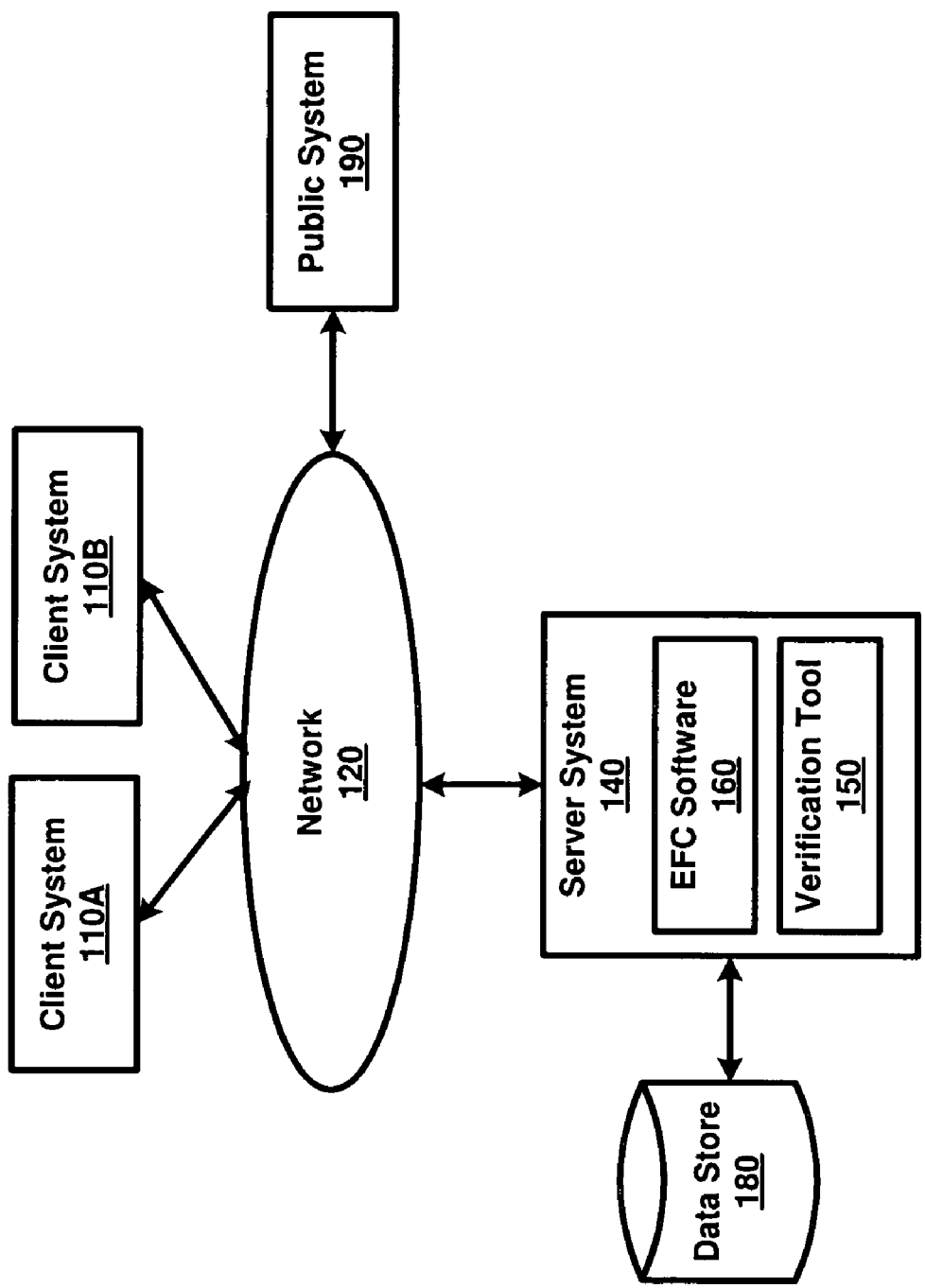
FIG. 1 is a block diagram illustrating an example environment (computing system) in which several aspects of the present invention can be implemented.

According to an aspect of the present invention, a digital processing system verifies whether a software package designed to calculate EFC is implemented in compliance with a specification provided by the US Federal Government for a specific year. A sample specification for the year 2008-2009 is described in further detail in a document entitled, "Specifications For Software Developers, Academic Year 2008-2009, Draft Version 1.0" dated Aug. 1, 2007 and published by the office of the Federal Student Aid, a United States Department of Education.

In one embodiment, a set of sample ISIRs provided by the US Federal Government is received, with each sample ISIR containing the details of a student and a corresponding expected set of EFC values pre-calculated based on the specification for that specific year.

The digital processing system then sends the details of the student contained in a sample ISIR to the software package (being verified) and in response, receives the corresponding calculated values of the EFC calculated by the software package based on the details of the student. The calculated values of the EFC and the expected values of the EFC contained in the sample ISIR are then compared to determine whether any difference exists between the calculated and the expected values. In a scenario that the difference exists, the calculated values are marked as being non-compliant with the specification for the specific year.

By checking whether the package at least provides accurate EFC results for the sample ISIRs provided by the Federal Government, the accuracy of implementation of the EFC calculation in the software package may be verified with at least some level of certainty.

According to another aspect of the present invention, a discrepancy report is generated after processing all the sample ISIRs received. In one embodiment, the discrepancy report specifies the details of the EFC values marked as being non-compliant with the specification. The discrepancy report further indicates the differences between the individual calculated values of the EFC and the corresponding expected values for each of the sample ISIRs.

In another embodiment, the discrepancy report generated indicates whether each of the calculated EFC values is compliant or non-compliant with the specification for the specific year. Further, the differences between the individual calculated values of the EFC and the corresponding expected values contained in the sample ISIRs are indicated for the EFC values marked as being non-compliant with the specification.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

FIG. 1 is a block diagram illustrating an example environment (computing system) in which several aspects of the present invention can be implemented. The block diagram is shown containing client systems 110A-110B, network 120, server system 140 (containing EFC software 160 and verification tool 150), data store 180 and public system 190.

Merely for illustration, only representative number/type of systems is shown in the Figure. Many environments often contain many more systems, both in number and type, depending on the purpose for which the environment is designed. Each system/device of FIG. 1 is described below in further detail.

Network 120 provides connectivity between client systems 110A-110B, server system 140 and public system 190. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Data store 180 facilitates storage and retrieval of a collection of data. Data store 180 may store data such as the information contained in the FAFSAs submitted by various students, the corresponding calculated EFC values, the ISIRs of the students etc. In one embodiment, data store 180 is implemented using relational database technologies and therefore provides storage and retrieval of data using structured queries such as SQL.

Public system 190 represents a server system facilitating the office of the Federal Student Aid (part of the US Federal Government) to provide information regarding the FAFSA, SAR/ISIR and the formula/specification used for calculating the EFC values based on the FAFSA and the corresponding changes made during (annual) revision. Public system 190 may also maintain multiple versions of the formula/specification (and/or the sample ISIRs) corresponding to different years for ready download.

Each of client systems 110A-110B represents a system such as a personal computer, workstation, mobile station, etc., used by a user/student to submit information (forming a FAFSA) to EFC software 160 executing in server system 140. The information may be generated (and the corresponding FAFSA submitted) according to a suitable interface. The users/students may also receive the ISIRs (or SARs) from EFC software 160 in response to the information submitted as FAFSAs (or a corresponding request for calculation of the EFC values).

Server system 140 represents a server, such as a web/application server, which executes software packages (such as EFC software 160) capable of processing the information (for example, forming the FAFSAs) submitted by users/students and calculating the corresponding EFC values requested by the users/students using one of client systems 110A-110B. Server system 140 may also contain other software programs such as operating system, device drivers, etc., (not shown) that provides a run time environment facilitating execution of EFC software 160 and verification tool 150.

EFC software 160 represents a software package designed to process the details/responses of a student (forming FAFSAs or ISIRs) submitted by users/students and to calculate the EFC values corresponding to the submitted information based on a formula/specification of interest, for example, the formula/specification corresponding to the year in which admission to various schools are sought by the users/students. EFC software 160 may also maintain the information contained in FAFSAs or ISIRs submitted by users/students, the corresponding calculated EFC values, etc. in data store 180.

It may be appreciated that EFC software 160 may implement various formula/specifications (incorporating different changes) provided by public system 190. In a scenario that public system 190 indicates that a new change to the formula/specification has occurred (which is common each year), it may be necessary that the EFC software 160 be appropriately modified to provide the newly changed formula/specification.

It may be desirable that the modifications made to EFC software 160 (or the EFC software implemented for a specific year, in general) be tested to verify whether the new implementation of EFC software 160 (containing the modifications) is designed to calculate the EFC values according to (i.e. compliant with) the newly changed formula/specification (which may be applicable for an year of interest).

In one embodiment, the office of the Federal Student Aid provides a set of sample ISIRs containing the details of a corresponding set of (imaginary) students. Each sample ISIR also contains the expected set of EFC values pre-calculated based on the newly changed formula/specification. The set of sample ISIRs may be provided for download in public system 190.

In one prior approach, a user/administrator manually provides the details of some of the sample ISIRs (selected randomly) to EFC software 160 and then manually compares the calculated values of EFC (received in response) with the expected set of EFC values. Based on the manual comparisons, the user/administrator may then determine whether the implementation of EFC software 160 is compliant with the newly changed formula/specification (corresponding to a specific year). Such a manual approach requires the user/administrator to spend considerable amount of time and/or resources in determining whether software package calculating EFC is compliant to a formula/specification (of interest).

Verification tool 150 provided according to an aspect of the present invention enables a user/administrator to verify whether a software package calculating EFC is implemented according to (i.e. is compliant with) a specification as described below with examples.

3. Verifying the Compliance of a Software Package Calculating EFC

Figure 2:
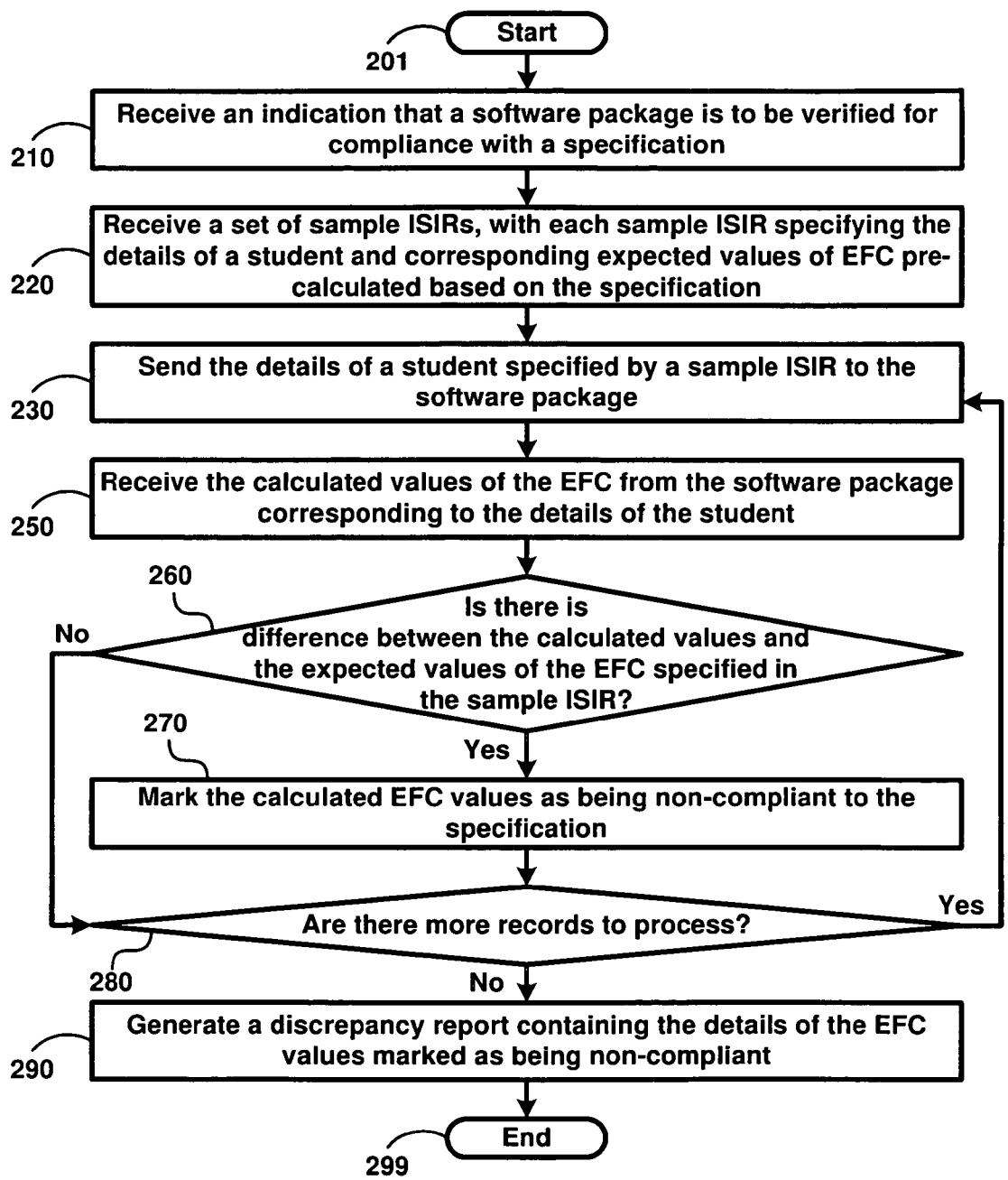
FIG. 2 is a flowchart illustrating the manner in which the compliance of a software package calculating EFC to a specification is verified according to an aspect of the present invention.

FIG. 2 is a flowchart illustrating the manner in which the compliance of a software package calculating EFC to a specification is verified according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, verification tool 150 receives an indication that a software package is to be verified for compliance with a specification. The indication may be received from a user/administrator using an appropriate interface provide on a display unit (not shown in FIG. 1) associated with server system 140. Alternatively, the indication may be received in the form of a request from the user/administrator using one of client systems 110A-110B.

The indication may indicate the specific software package to be verified and the specific formula/specification to be used (or the year of interest) for verification of compliance. For example, the received indication may indicate that EFC software 160 is to be verified for compliance to the specification corresponding to the year 2008.

In step 220, verification tool 150 receives a set of sample ISIRs provided by the Department of Education, with each sample ISIR specifying the details of a (imaginary) student and corresponding expected values of EFC pre-calculated based on the specification (of the indicated year). As readily understood by one skilled in the relevant arts, the US Department of Education, usually provides sample ISIRs of the order of a few thousands for each year. Each set may thus contain a corresponding number of sample ISIRs.

While the sample ISIRs are described as being provided by the US Department of Education based on the present practices in the United States, it should be appreciated that corresponding information can be provided by other branches of the US Federal Government, depending on the organization structure, roles and responsibilities, applicable laws, etc.

The set of sample ISIRs may be received in different ways, for example, the sample ISIRs may be received along with the indication indicating the software package and the specification received in step 210. Alternatively, the set of sample ISIRs corresponding to the specification indicated by the previously received indication may be downloaded from public system 190, for example, using structured representations such as position delimited flat file.

In the above example, verification tool 150 may download the set of sample ISIRs corresponding to year 2008 (i.e., 2008-2009) provided by the US Department of Education from public system 190. Verification tool 150 may maintain copies of the downloaded sample ISIRs in data store 180 for later retrieval.

In step 230, verification tool 150 sends the details of a student specified by a sample ISIR to the software package. The details of a student may be sent to the software package in a known way. For example, the software package may provide interfaces in the program logic (instructions) constituting the software package which enables external software programs to send the details of students directly (without having a request/response). As such, verification tool 150 may invoke the appropriate interface for sending the details of the student specified by the sample ISIR to the software package.

In step 250, verification tool 150 receives the calculated values of the EFC from the software package corresponding to the details of the student sent in step 230. The calculated values of the EFC may be received from the software package as a response to sending of the details of the student. Alternatively, the invoked interface (or any other appropriate interface) may provide the calculated values of the EFC.

It may be appreciated that other approaches for sending the details of the student and receiving the corresponding calculated values of the EFC can be implemented in other environments also without departing from the scope and spirit of various aspects of the present invention, as will be apparent to one skilled in the relevant arts by reading the disclosure provided herein.

In step 260, verification tool 150 determines whether there exists a difference between the calculated values and the expected values of the EFC specified in the sample ISIR. The determination may be performed by comparing the individual calculated values with the corresponding expected values. In a scenario there exists at least one individual calculate value which is different from the corresponding expected value, it is determined that a difference exists. Alternatively, if all the individual calculated values are equal to (i.e., match) the corresponding expected values, it is determined that a difference does not exist. Control passes to step 270 if a difference exits and to step 280 otherwise.

In step 270, verification tool 150 marks the calculated EFC values as being non-compliant to the specification, since there exists a difference between the calculate values of the EFC (based on the details of the student contained in the sample ISIR) and the expected values of the EFC pre-calculated based on the specification (also contained in the sample ISIR). Control then passes to step 280.

In step 280, verification tool 150 determines whether there are more records to process. The determination may be performed by maintaining a flag associated with each of the set of sample ISIRs indicating whether the corresponding sample ISIR has been processed (that is sent to software package) or not. Control passes to step 230 if there exists at least one flag indicating that the corresponding sample ISIR has not been processed and to step 290 otherwise.

In step 290, verification tool 150 generates a discrepancy report containing the details of the EFC values marked as being non-compliant. The discrepancy report may be generated in response to a request from a user/administrator using one of client systems 110A-110B. The discrepancy report may be generated at any time, instead of after completion of processing of all sample ISIRs.

In one embodiment, the discrepancy report contains the details of the students of the EFC values marked as being non-compliant in step 270. The discrepancy report also indicates the specific individual calculated EFC values that are different from the corresponding expected EFC values for each of the EFC values marked as non-compliant.

In another embodiment, the discrepancy report generated indicates whether each of the calculated EFC values (corresponding to the set of sample ISIRs) is compliant or non-compliant with the specification, with the differences in individual calculated values and the corresponding expected values being indicated only for the EFC values marked as non-compliant. The flow chart ends in step 299.

Thus, a user/administrator may verify whether a software package calculating EFC is implemented according to a specification (of interest). In a scenario that the software package is indicated to be non-compliant with the specification, the software instructions and/or the program logic constituting the software package may be appropriately modified for compliance with the specification. The description is continued illustrating the manner in which compliance of software packages calculating EFC to a specification of interest is verified in one embodiment.

4. Example Illustrating Verification of Compliance

FIGS. 3, 4, and 5 together illustrate the manner in which compliance of a software package calculating EFC to a (federal) specification is verified in one embodiment. Each of the Figures is described in detail below, with the description continued with respect to a specific environment in which several aspects of the present invention can be implemented in one embodiment.

FIG. 3 is a block diagram illustrating the details of a software package calculating EFC (to be verified for compliance with a specification) in one embodiment. However, the features of the invention can be applied to other software packages/programs (other types, having different architectures, etc.) as well, as will be apparent to one skilled in the relevant arts by reading the disclosure provided herein.

Client system 110B is shown executing a browser 310, which provides an interface used by users/students for interacting with EFC software 160. Browser 310 is designed to send requests (e.g., in the form of URLs) to EFC software 160 (via path 161) and to receive in response, corresponding interface related data, for example, files encoded in hypertext markup language (HTML), from EFC software 160.

Browser 310 then generates corresponding web pages on a portion of a display unit (not shown) associated with client system 110B. Browser 310 also sends the information specified in the web pages to EFC software 160. In one embodiment, browser 310 is implemented using Internet Explorer 6.0 available from Microsoft Corporation.

Thus, browser 310 enables the users/students to submit their information (forming FAFSAs) to EFC software 160 and also to send separate requests to EFC software 160 for calculating the EFC corresponding to the submitted information (using the appropriate interfaces generated on the display unit). Browser 310 also displays the calculated values of the EFC (and/or the corresponding ISIRs) received in response from EFC software 160.

EFC software 160 represents a software package designed to calculate EFC and is shown containing components such as front end 330, EFC engine 350 and adaptor 370. EFC software 160 may also contain other components performing other operations, though not shown for conciseness. In one embodiment, EFC software 160 is implemented using Oracle Student System available from Oracle Corporation.

Front end 330 receives requests (via path 161) from browser 310 (e.g. in the form of URLs) and sends in response corresponding interface related data (e.g. in the form of HTML files). Front end 330 also receives the details of the students from browser 310 (generally in multiple packets) and forwards the details to EFC engine 350.

In response to a request for calculation of the EFC values, front end 330 may indicate to EFC engine 350 to commence processing of the submitted details of the students. Front end 330 then receives the EFC values calculated based on the submitted information from EFC engine 350 and forwards the EFC values to browser 310 in a convenient format.

EFC engine 350 receives the details of students from front end 350 and calculates the EFC values based on a formula/specification of interest. In one embodiment, the formula/specification of interest is determined as the (federal) specification corresponding to the year in which admission to various schools are sought by the users/students as specified in the details. EFC engines 350 then sends the calculated values of EFC to front end 330.

EFC engine 350 is also designed to receive the details of students from adaptor 370 and to send in response the corresponding calculated values of the EFC. It may be appreciated that the details of the students received and the EFC values sent between EFC engine 350 and front end 330/adaptor 370 may be performed in a same/different manner (using an appropriate data format) in a known way.

Adaptor 370 provides an interface to verification tool 150 for interacting with EFC software 160. Adaptor 370 may receive requests (via path 165) containing the details of the student (generally not in the form of FAFSAs) from verification tool 150 and forwards the details to EFC engine 350. Adaptor 370 also receives the corresponding calculated values of the EFC from EFC engine 350 and forwards them to verification tool 150 (after converting them to a suitable format).

In one embodiment, adaptor 370 provides an interface table which may be populated by verification tool 150 with the details of the students for whom the corresponding EFC values are to be calculated. In response to receiving an indication from verification tool 150, adaptor 370 may send the details of each student contained in the interface table to EFC engine 350 and to store the corresponding calculated values of the EFC received from EFC engine 350 in the interface table. On completion of processing of the details in the interface table, adaptor 370 may send an indication to verification tool 150 indicating the completion.

In an alternative embodiment, adaptor 370 is implemented to support a command line interface (CLI). As such, verification tool 150 stores the details of a student as a file containing text in a pre-defined format, and then invokes EFC software 160 as a command in the CLI with the name of the text file specified as a parameter to the command. Adaptor 370 may then parse the parameters to determine the name of the input text file, read the content of the input text file (as specified by the name) into a memory and then commence processing of the information by EFC engine 350. Adaptor 370 then writes the corresponding calculated EFC values to an output text file with a pre-defined name (or a name specified as another parameter of the command).

It may be appreciated that front end 330, EFC engine 350 and adaptor 370 may use a local storage (not shown) or data store 180 for storing information such as details of the students (assuming the student enters the details in multiple web pages), the calculated EFC values, etc. The stored information may be used by the other components of EFC software 160 or may be used for generating the responses sent (via paths 161 and 165) by EFC software 160.

Verification tool 150 sends details of students to adaptor 370 (via path 165) and receives the corresponding calculated values of the EFC as calculated by EFC engine 350. Verification tool 150 may send the details of students in response to receiving an indication that EFC software 160 is to be verified for compliance with a specification based on a set of ISIR as described below with example.

5. Receiving an Indication to Verify Compliance

FIG. 4 depicts an interface using which an indication that a software package is to be verified for compliance with a specification (corresponding to a specific year) based on a set of sample ISIRs is received in one embodiment.

Display area 410 (titled "EFC Reconciliation") enables a user/administrator to specify various parameters determining the manner of performance of verification of compliance of a software package calculating EFC to a specification of interest. Display area 410 may represent a portion of a screen that may be displayed by verification tool 150 on a display unit (not shown) associated with server system 140

Select field 420 (labeled "Application") displays a list of names of software packages calculating EFC which may be verified for compliance, thereby enabling a user/administrator to select the desired software package (such as "ACME EFC Application 2.0") for verification. Thus, though only a single EFC software 160 is shown in FIG. 1, many of such software packages can be executed in server system 140 (or other external systems), and each of such software packages corresponds to one name that can be selected in select field 420.

Text field 430 (labeled "Batch Year") enables a user/administrator to specify the year ("2008") for which the verification is to be performed. As noted above, the US Federal Government generally specifies a corresponding formula/specification (e.g., for year 2008-2009) as well as a corresponding set of sample ISIRs for each year.

As such, verification tool 150 performs the verification of the software package selected in select field 420 for compliance with the formula/specification corresponding to the year specified in text field 430. Verification tool 150 may use a set of sample ISIRs corresponding to the specified year for performing verification. The set of sample ISIRs and the formula/specification corresponding to the specified year may be downloaded from public system 190.

Text field 450 (labeled "SSN") enables a user/administrator to indicate a subset of the sample ISIRs corresponding to the specified year to be used for verification of the selected software package. By specifying a social security number (SSN, of an imaginary student) or a portion thereof, the verification is performed only with the sample ISIRs matching the specified SSN (or the portion thereof). In a scenario that the value of text field 450 is not specified (that is, left blank as shown), all the sample ISIRs corresponding to the specified year are used for verification of the selected software package.

Text field 460 (labeled "Report Mode") enables a user/administrator to indicate the manner in which a discrepancy report is to be generated after verification. A value of "E" (for "Error") for text field 460 may indicate that only the details of the EFC values marked as non-compliant are to be included in the discrepancy report, while a value of "A" (for "All") may indicate that the details of all the EFC values (corresponding to the sample ISIRs) are to be included in the discrepancy report.

Button 480 (labeled "OK") enables a user/administrator to send an indication to verification tool 150 that the selected software package is to be verified for compliance with the specification corresponding to the specified year. In response, verification tool 150 may perform the verification of the selected software package as described below with examples.

6. Performing Verification of the Software Package

Thus, on clicking button 480, verification tool 150 may download/retrieve the sample ISIRs corresponding to the year specified in text field 430. Verification tool 150 may then determine the subset of sample ISIRs to be used for verification based on the downloaded/retrieved sample ISIRs and the value specified in text field 450. Since the value of text field 450 is left blank, all the sample ISIRs are used for performing verification.

Verification tool 150 then sends the details of a student in a sample ISIR contained in the set of sample ISIRs to the software package "ACME EFC Application 2.0" selected in select field 420 (assumed to be EFC software 160).

As described above, in one embodiment, verification tool 150 populates the details of the student in the interface table provided by adaptor 370 (contained in EFC software 160). Verification tool 150 then sends an indication to adaptor 370 to process the interface table. On receiving another indication from adaptor 370 indicating completion of processing, verification tool 150 retrieves the calculated values of the EFC (corresponding to the details of the student) from the interface table.

Verification tool 150 then compares the calculated values with the expected values of the EFC contained in the sample ISIR (and which have been pre-calculated based on the same specification). Verification tool 150 determines whether a difference exists between the calculated values and the expected values of the EFC and marks the EFC values as being non-compliant if the difference is determined to exist.

Similarly, verification tool 150 performs the above operations with respect to each of the set of sample ISIRs determined to be used for verification. During this process, verification tool 150 may maintain information such as the SSNs/identifiers corresponding to the marked EFC values, the SSNs/identifiers of the ISIRs that have yet to be processed etc. in a memory or in data store 180.

After all the sample ISIRs have been processed, verification tool 150 determines the manner in which the discrepancy report is to be generated based on the value of text field 460. Thus, in the above scenario where the value in text field 460 is "E", verification tool 150 determines that only the details of the error records (the EFC values marked as non-compliant) are to be included in the discrepancy report. Verification tool 150 then generates the corresponding discrepancy report as described below with examples.

7. Generating Discrepancy Report

FIG. 5 depicts a portion of a discrepancy report generated based on the verification of compliance of a software package to a specification in one embodiment. The discrepancy report may be generated by verification tool 150 after processing the sample ISIRs determined to be used for verification based on the manner specified by the value in text field 460.

Line 511 ("EFC Reconciliation Report") indicates that the report is a discrepancy report indicating whether a software package designed to calculate EFC is implemented according to a specification. Line 512 ("Batch Year: 2008") indicates that the specification used for verification corresponds to the year "2008". Lines 513 ("SSN:") indicates that no SSN were specified in the interface of FIG. 3 and as such the verification was performed with all of the sample ISIRs provided by the US Federal Government corresponding to the year "2008-2009".

Line 515 ("Application: ACME EFC Application 2.0") indicates that the name of the software package verified. Lines 520 and rows 561-587 specify the details of a set of calculated EFC values marked as being non-compliant with the specification during verification of the software package "ACME EFC Application 2.0". In particular, line 520 specifies some of the details of the student corresponding to the marked EFC values such as the SSN "999750997", the last name "FORMULA3" etc.

Column 541 indicates the names of the different individual values of EFC (hereafter EFC variables) that are to be calculated based on the details of the student. Column 542 (labeled "CPS") specifies the expected value of each of the EFC variables pre-calculated based on the specification (as contained in the ISIR), while column 543 (labeled "SYSTEM") specifies the calculated value of each of the EFC variables (as received from the software package). Column 544 (labeled "Diff(Y/N)") indicates whether there exists a difference between the calculated value and the expected values of each of the EFC variables. A value of "Y" indicates that the calculated value is different from the expected value and a value of "N" indicates otherwise.

Each of rows 561-587 specifies the details of a corresponding EFC variable. In particular, line 561 specifies that the EFC variable with name "Primary Alternate Month 1" has an expected value of "0" and a calculated value of "0", and as such the difference is indicated to be "N". It may be observed that line 581 specifies a EFC variable with name "Asset Protect Allow" having a expected value of "37900" and a calculated value of "27900". As such the difference is indicated to be "Y" indicating that the calculate EFC values is non-compliant with the specification.

Though, the discrepancy report of FIG. 5 is shown containing only a portion of the details of a single set of EFC values marked as being non-compliant with the specification, it may be appreciated that a discrepancy report generally contains the details of all of the EFC values marked as non-compliant.

It should be appreciated that the above-described features of verification tool 150 may be implemented in a combination of one or more of hardware, software and firmware (though embodiments are described as being implemented in the form of software instructions). The description is continued with respect to an embodiment in which various features are operative by execution of corresponding software instructions.

8. Digital Processing System

Figure 6:
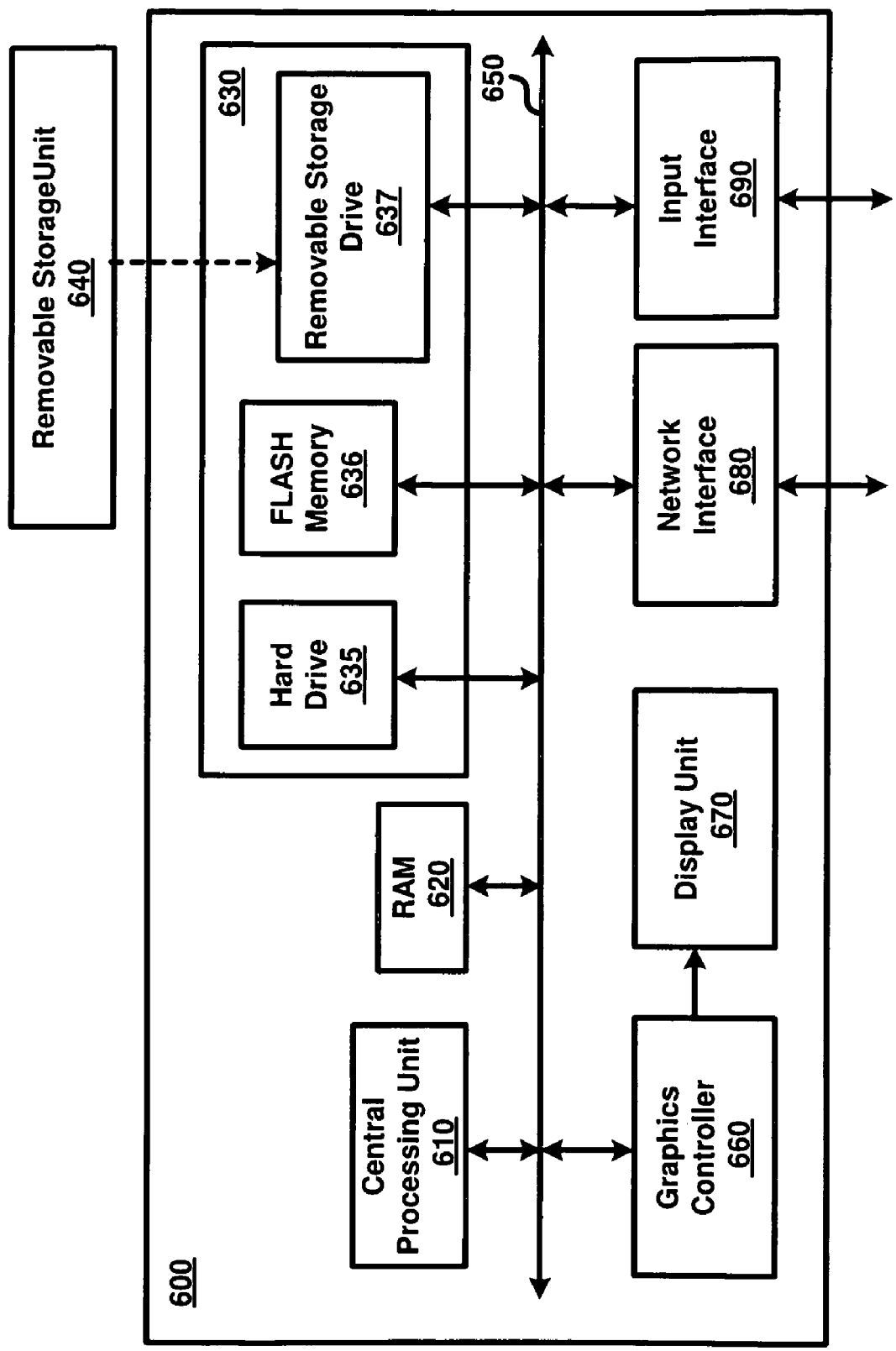
FIG. 6 is a block diagram illustrating the details of digital processing system in which various aspects of the present invention are operative by execution of appropriate software instructions.

FIG. 6 is a block diagram illustrating the details of digital processing system 600 in which various aspects of the present invention are operative by execution of appropriate software instructions. Digital processing system 600 may correspond to any system (e.g., server system 140) executing verification tool 150.

Digital processing system 600 may contain one or more processors such as a central processing unit (CPU) 610, random access memory (RAM) 620, secondary memory 630, graphics controller 660, display unit 670, network interface 680, and input interface 690. All the components except display unit 670 may communicate with each other over communication path 650, which may contain several buses as is well known in the relevant arts. The components of FIG. 6 are described below in further detail.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. RAM 620 may receive instructions from secondary memory 630 using communication path 650.

Graphics controller 660 generates display signals (e.g., in RGB format) to display unit 670 based on data/instructions received from CPU 610. Display unit 670 contains a display screen to display the images (e.g., portions of screens depicted in FIG. 4) defined by the display signals. Input interface 690 may correspond to a keyboard and a pointing device (e.g., touch-pad, mouse) and may be used to provide inputs (e.g., those depicted in FIG. 4). Network interface 680 provides connectivity to a network (e.g., using Internet Protocol), and may be used to communicate with other connected systems (such as client systems 110A-110B and public system 190) of FIG. 1.

Secondary memory 630 may contain hard drive 635, flash memory 636, and removable storage drive 637. Secondary memory 630 may store the data (e.g., portions of data depicted in FIG. 5) and software instructions, which enable digital processing system 600 to provide several features in accordance with the present invention.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 640 or hard disk installed in hard drive 635. These computer program products are means for providing software to digital processing system 600. CPU 610 may retrieve the software instructions, and execute the instructions to provide various features of the present invention described above.

9. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer implemented method of testing a program logic of a software package, said program logic being required to calculate Expected Family Contribution (EFC) in compliance with a specification for a specific year upon execution of said software package, said specification being provided by the US Federal Government, said method comprising:

receiving a plurality of sample Institutional Student Information Records (ISIRs) provided by the US Federal Government for said specific year, wherein each of said plurality of sample ISIRs contains details of a student and a corresponding expected set of EFC values pre-calculated based on said specification for said specific year;

sending the details of a first student contained in a first sample ISIR to said software package during execution of said software package, wherein said first sample ISIR is contained in said plurality of sample ISIRs;

receiving a first set of EFC values from said software package in response to said sending, wherein said first set of EFC values are calculated by said program logic of said software package based on the details of said first student based on execution of said software package;

determining whether there exists a difference between said first set of EFC values and the expected set of values corresponding to said first sample ISIR; and indicating that said program logic of said software package is non-compliant with said specification in the calculation of said first set of EFC values, if said determining determines that said difference exists,
wherein said receiving of said plurality of sample ISIRs, said receiving of said first set of EFC, said sending, said determining and said indicating are performed in said digital processing system by execution of instructions by one or more processors contained in said digital processing system.

2. The computer implemented method of claim 1, wherein said sending, said receiving, said determining and said marking are performed for each of said plurality of sample ISIRs, said method further comprising:
generating a discrepancy report indicating a plurality of sets of EFC values which are marked as being non-compliant with said specification, wherein each of said plurality of sets of EFC values are calculated by said software package based on the details of a student contained in a corresponding one of a set of sample ISIRs contained in said plurality of sample ISIRs.

3. The computer implemented method of claim 2, wherein said discrepancy report further indicates the difference between the set of EFC values received from said software package and the expected set of values for each of said plurality of sets of EFC values.

4. The computer implemented method of claim 1, wherein said sending, said receiving, said determining and said marking are performed for each of said plurality of sample ISIRs, said method further comprising:
generating a report indicating whether the set of EFC values calculated by said software package based on each of said plurality of sample ISIRs is compliant or non-compliant with said specification,
wherein said report further indicates the difference between the set of EFC values received from said software package and the corresponding expected set of values for each of a plurality of sets of EFC values determined to be non-compliant with said specification.

5. The computer implemented method of claim 1, wherein said sending, said receiving, said determining and said marking are performed for each of said plurality of sample ISIRs, said method further comprising:
indicating that said software package is compliant with said specification if none of the sets of EFC values calculated by the software package based on said plurality of sample ISIRs are marked as being non-compliant with said specification.

6. The computer implemented method of claim 5, further comprising receiving an indication that only a subset of said plurality of sample ISIRs are to be used for verifying said software package, wherein said sending, said receiving, said determining and said marking are performed only with each of said subset of said plurality of sample ISIRs.

7. The computer implemented method of claim 1, wherein said specification comprises a formula provided by Federal Student Aid, an office of the United States Department of Education.

8. A computing system comprising:
a server system to execute a software package for calculating Expected Family Contribution (EFC), said software package comprising a program logic required to calculate said EFC according to a specification for a specific year upon execution of said software package, said specification being provided by the US Federal Government; and
a verification tool to test said program logic of said software package, said verification tool being operable to:
receive a plurality of sample Institutional Student Information Records (ISIRs) provided by the US Federal Government for said specific year, wherein each of said plurality of sample ISIRs contains details of a student and a corresponding expected set of EFC values pre-calculated based on said specification for said specific year;
send the details of a first student contained in a first sample ISIR to said software package, wherein said first sample ISIR is contained in said plurality of sample ISIRs, wherein said server system generates a first set of EFC values by processing the details of said first student according to said program logic based on execution of said software package;
receive said first set of EFC values from said software package in response to said sending;
determine whether there exists a difference between said first set of EFC values and the expected set of values corresponding to said first sample ISIR; and
indicate that said program logic of said software package is non-compliant with said specification in the calculation of said first set of EFC values, if said determining determines that said difference exists.

9. The computing system of claim 8, wherein said verification tool sends, receives, determines and marks the EFC values corresponding to each of said plurality of sample ISIRs, said verification tool further operable to:
generate a discrepancy report indicating a plurality of sets of EFC values which are marked as being non-compliant with said specification, wherein each of said plurality of sets of EFC values are calculated by said software package based on the details of a student contained in a corresponding one of a set of sample ISIRs contained in said plurality of sample ISIRs.

10. The computing system of claim 9, wherein said discrepancy report further indicates the difference between the set of EFC values received from said software package and the expected set of values for each of said plurality of sets of EFC values.

11. The computing system of claim 8, wherein said verification tool sends, receives, determines and marks the EFC values corresponding to each of said plurality of sample ISIRs, said verification tool further operable to:
generate a report indicating whether the set of EFC values calculated by said software package based on each of said plurality of sample ISIRs is compliant or non-compliant with said specification,
wherein said report further indicates the difference between the set of EFC values received from said software package and the corresponding expected set of values for each of a plurality of sets of EFC values determined to be non-compliant with said specification.

12. The computing system of claim 8, wherein said verification tool sends, receives, determines and marks the EFC values corresponding to each of said plurality of sample ISIRs, said verification tool further operable to:
indicate that said software package is compliant with said specification if none of the sets of EFC values calculated by the software package based on said plurality of sample ISIRs are marked as being non-compliant with said specification.

13. The computing system of claim 12, wherein said verification tool further receives an indication that only a subset of said plurality of sample ISIRS are to be used to verify said software package, wherein said verification tool sends, receives, determines and marks the EFC values corresponding to each of said subset of said plurality of sample ISIRs.

14. The computing system of claim 8, wherein said specification comprises a formula provided by Federal Student Aid, an office of the United States Department of Education.

15. The computing system of claim 14, further comprising a public system to provide for download said formula for said specific year and said plurality of sample ISIRs for said specific year, wherein said verification tool receives said plurality of sample ISIRs for said specific year from said public system.

16. A machine readable medium storing one or more sequences of instructions for causing a system to test a program logic of a software package, said program logic being required to calculate Expected Family Contribution (EFC) in compliance with a specification for a specific year upon execution of said software program, wherein said specification comprises a formula provided by Federal Student Aid, an office of the United States Department of Education, wherein execution of said one or more sequences of instructions by one or more processors contained in said system causes said system to perform the actions of:

receiving a plurality of sample Institutional Student Information Records (ISIRs) provided by the US Federal Government for said specific year, wherein each of said plurality of sample ISIRs contains details of a student and a corresponding expected set of EFC values pre-calculated based on said specification for said specific year;

sending the details of a first student contained in a first sample ISIR to said software package, wherein said first sample ISIR is contained in said plurality of sample ISIRs;

receiving a first set of EFC values from said software package in response to said sending, wherein said first set of EFC values are calculated by said program logic of said software package based on the details of said first student based on execution of said software package;

determining whether there exists a difference between said first set of EFC values and the expected set of values corresponding to said first sample ISIR; and indicating that said program logic of software program is non-compliant with said specification in the calculation of said first set of values, if said determining determines that said difference exists.

17. The machine readable medium of claim 15, wherein said sending, said receiving, said determining and said marking are performed for each of said plurality of sample ISIRs, said system further comprising one of more instructions for:

generating a discrepancy report indicating a plurality of sets of EFC values which are marked as being non-compliant with said specification, wherein each of said plurality of sets of EFC values are calculated by said software package based on the details of a student contained in a corresponding one of a set of sample ISIRs contained in said plurality of sample ISIRs.

18. The machine readable medium of claim 16, wherein said discrepancy report further indicates the difference between the set of EFC values received from said software package and the expected set of values for each of said plurality of sets of EFC values.

19. The machine readable medium of claim 15, wherein said sending, said receiving, said determining and said marking are performed for each of said plurality of sample ISIRs, said system further comprising one of more instructions for:

generating a report indicating whether the set of EFC values calculated by said software package based on each of said plurality of sample ISIRs is compliant or non-compliant with said specification, wherein said report further indicates the difference between the set of EFC values received from said software package and the corresponding expected set of values for each of a plurality of sets of EFC values determined to be non-compliant with said specification.

20. The machine readable medium of claim 15, wherein said sending, said receiving, said determining and said marking are performed for each of said plurality of sample ISIRs, said system further comprising one of more instructions for:

indicating that said software package is compliant with said specification if none of the sets of EFC values calculated by the software package based on said plurality of sample ISIRs are marked as being non-compliant with said specification.

* * * * *